United States Patent
Kundu et al.

(10) Patent No.: US 9,749,137 B2
(45) Date of Patent: *Aug. 29, 2017

(54) METHOD AND SYSTEM FOR SECURING THE ENTRY OF DATA TO A DEVICE

(71) Applicant: INTERNATIONAL BUSINESS MACHINES CORPORATION, Armonk, NY (US)

(72) Inventors: Ashish Kundu, Elmsford, NY (US); Amit A. Nanavati, New Delhi (IN); Danny Soroker, Larchmont, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/007,809

(22) Filed: Jan. 27, 2016

(65) Prior Publication Data

US 2016/0142209 A1    May 19, 2016

Related U.S. Application Data

(63) Continuation of application No. 13/863,255, filed on Apr. 15, 2013, now Pat. No. 9,275,213.

(51) Int. Cl.
  *G06F 21/00* (2013.01)
  *H04L 9/32* (2006.01)
  *G06F 21/35* (2013.01)

(52) U.S. Cl.
  CPC ............ *H04L 9/3231* (2013.01); *G06F 21/35* (2013.01); *H04L 9/3226* (2013.01); *G06F 2221/031* (2013.01)

(58) Field of Classification Search
  CPC ..... G06F 21/32; G06F 21/34; H04L 63/0861; H04L 9/3231; H04L 9/0866
  (Continued)

(56) References Cited

U.S. PATENT DOCUMENTS 7,209,557 B2    4/2007  Lahiri
7,243,236 B1 *  7/2007  Sibert ................... G06F 21/51
                                                                    380/255

(Continued)

OTHER PUBLICATIONS

U.S. Notice of Allowance dated Oct. 21, 2015 in co-pending U.S. Appl. No. 13/863,255.

(Continued)

*Primary Examiner* — Kambiz Zand
*Assistant Examiner* — Stephen Sanders
(74) *Attorney, Agent, or Firm* — Louis J. Percello, Esq.; McGinn IP Law Group, PLLC

(57) ABSTRACT

Crypto-glasses include systems that implement a method of authentication of users by blinking, the crypto-glasses including a frame configured so as to be worn by a user, a processor, a display device communicating with the processor so as to dynamically display data, and a communication unit, as executed by the processor, to execute the method of authentication by transmitting data to the display device for performing the authentication of the user to interact with the display device. The communication unit is configured to display in an optical unit of the crypto-glasses a key map which correlates data input into the display device with keys of the display device, the key map indicating data different from that of the keys of the display device.

20 Claims, 8 Drawing Sheets

(58) Field of Classification Search
USPC .......................................................... 713/186
See application file for complete search history.

(56) References Cited

U.S. PATENT DOCUMENTS

| | | |
|---|---|---|
| 2002/0101988 A1 | 8/2002 | Jones |
| 2003/0133569 A1 | 7/2003 | Stern et al. |
| 2009/0027236 A1 | 1/2009 | Chiu |
| 2012/0075168 A1 | 3/2012 | Osterhout et al. |
| 2013/0069780 A1* | 3/2013 | Tran .................... A61B 5/0024 |
| | | 340/539.12 |

OTHER PUBLICATIONS

U.S. Office Action dated Feb. 11, 2015 in co-pending U.S. Appl. No. 13/863,255.
U.S. Office Action dated Aug. 4, 2015 in co-pending U.S. Appl. No. 13/863,255.

* cited by examiner

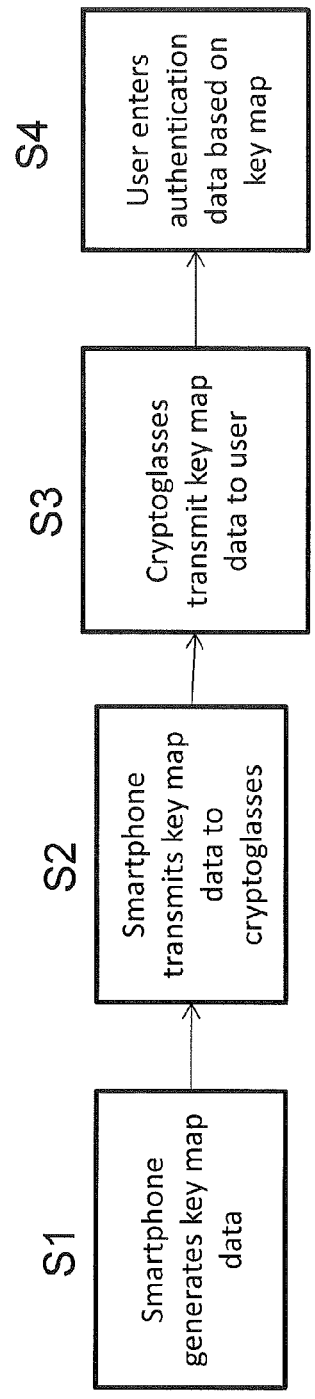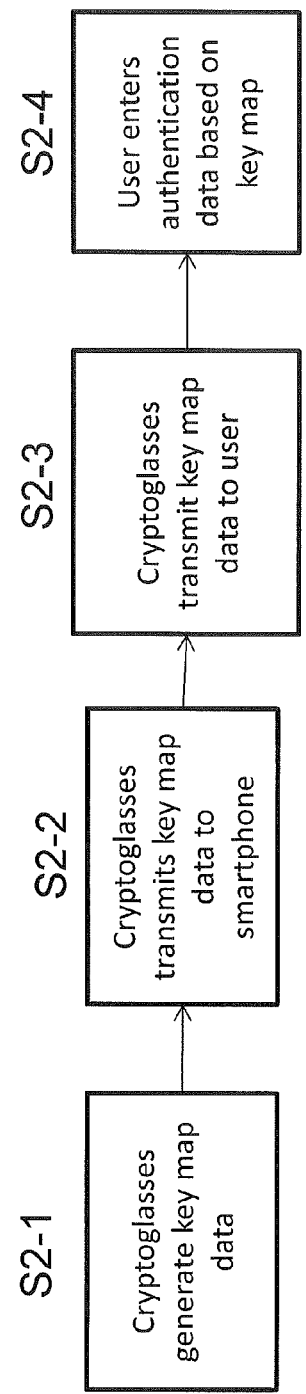

FIGURE 3A

| a | B | C | D |
|---|---|---|---|
| E | F | G | H |
| 1 | 2 | 3 | 4 |

Key-map as seen in cryptoglasses

| S1 | S2 | S3 | S4 |
|----|----|----|----|
| S4 | S5 | S6 | S7 |
| S8 | S9 | S10 | S11 |

As seen on device

FIGURE 3B

As seen on device

| S1 | S2 | S3 | S4 |
|----|----|----|----|
| S4 | S5 | S6 | S7 |
| S8 | S9 | S10 | S11 |

Key-map as seen in cryptoglasses

| ap mod n | Bp mod n | Cp mod n | Dp mod n |
|---|---|---|---|
| Ep mod n | Fp mod n | Gp mod n | Hp mod n |
| 1*r**p mod n | 2*r**p mod n | 3*r**p mod n | 4*r**p mod n |

FIG. 4
Table of unambiguous values of blinking

|  | Left eye | Right eye | Time for closing |
|---|---|---|---|
| 1 | Open | Open |  |
| 2 | Open | Closed | Instant |
| 3 | Closed | Open | Instant |
| 4 | Closed | Closed | Instant, Instant |
| 5 | Closed | Closed | Longer, Longer |
| 6 | Closed | Closed | Instant, Longer |
| 7 | Closed | Closed | Longer, Instant |
| 8 | Open | Closed | Longer |
| 9 | Closed | Open | Longer |
| 10: | continuous blinking: yes- mode 1 such as CAPS LOCK; no mode 0. |  |  |

- 8-character passwords (26*2+12 special symbols+10 digits)^8 combinations:
- 8-character passwords via blinking: 9*2 different values a character assumes: 18^8 = 11 019 960 576 combinations
  - LESS THAN standard password combinations; but MORE secure against attacks developed for traditional models
- More advanced blinking modes: Open, Closed, Not fully open/closed.

FIG. 5

Blinking for Authentication: group-based example (6 groups)

|  | LEFT | BOTH | RIGHT |
|---|---|---|---|
| SHORT BLINK | agmsy<br>BHNTZ<br>2 8 $ ) | bhntz<br>CIOU<br>0 6 @ * | ciou<br>AGMSY<br>1 7 # ( = |
| LONG BLINK | djpv<br>EKQW<br>5 ! & - | ekqw<br>FLRX<br>3 9 % _ | flrx<br>DIPV<br>4 ~ ^ + |

- lb = long-both, sr = short-right, etc.
- Example:
  - for password: wH0Zon1$st
  - the sequence is: lb,sl,sb,sl,sr,sb,sr,sl,sl,sb
- Probability of random correct guess is $6^{-n}$ for password of length n (e.g less than one millionth for an 8-character password)
- Can use more than 6 groups or less -- tradeoff between security and ease-of-use

METHOD AND SYSTEM FOR SECURING THE ENTRY OF DATA TO A DEVICE

The present application is a Continuation application of U.S. patent application Ser. No. 13/863,255, filed on Apr. 15, 2013, the entire content of which is incorporated herein by reference.

FIELD OF THE INVENTION

The present invention generally relates to a system and method for securing the entry of data to a device.

DESCRIPTION OF THE RELATED ART

Conventional devices into which passwords are entered, and especially devices where passwords are entered into a display such as smartphones, ATMs, etc., have many characteristics which make passwords and other authentication data vulnerable when being entered.

For instance, the smartphone may reveal each character on the display for a second or two during entry. Additionally, when a key is pressed on the screen of a smartphone the user is often given a visible cue indicating that the particular character has been pressed. The visible cue can take many possible forms such as a magnification of the character on the keypad, changing the color of the character on the keypad, movement of the character selected, etc. These visible indications of which characters are being entered can enable someone to steal the password by simply reading the password as it is entered.

In addition, on a smartphone the displayed keyboard normally has significantly fewer keys than a conventional keyboard. Therefore, entry of the characters on the on-screen keypad divulges possible character positions. For example, with a simplified keyboard it is not difficult to determine which character has been pressed by observing the operator's hands and location on the display, which the operator presses. Further compounding this problem is that the keypad displayed may vary depending on the character type being entered. Such a feature can reveal when the user types a number, lowercase or uppercase character, symbol, etc., further increasing the ability of an onlooker to judge which character is being entered.

Even when the actual entering of the password is not observed, the security of the password may still be degraded by residual marks left on the screen by the operator (e.g., "fingerprints"). Such fingerprints may reveal the password information entered by the location of the keys pressed or the path of a finger as it moved on the screen.

The environment in which a password is entered may further amplify the password's vulnerability to detection. Such environmental factors may be anything from a reflective surface to aid an on-looker, to security cameras, which record the password as it is entered, etc.

All of these issues weaken the security provided by a password entered into a device such as a smartphone, ATM, etc.

Therefore, it is insecure (i.e., non-secure) to enter passwords onto a smartphone. As a result, a smartphone, or other display device, is rendered insecure which makes the smartphone undesirable to use in accessing sensitive data.

While the above problems have been described in terms of a smart phone, the basic problem also applies everything from tablets, laptops, computer keyboards, ATMs, etc., or any device where a code is manually entered.

SUMMARY OF THE INVENTION

In view of the foregoing, and other, exemplary problems, drawbacks, and disadvantages of the conventional systems, it is an exemplary feature of the present invention to provide a device and method that allows secure entry of information into a device.

It is, therefore, an exemplary feature of the present invention to provide a structure and method for more securely entering passwords and authentication codes into a device.

An exemplary aspect of the invention is embodied as a method of entering data into a device. The method includes displaying in glasses a key map which correlates data input into the device with keys of the device, the key map indicating data different from that of the keys of the device.

An exemplary aspect of the invention may include transmitting the key map from the device to the glasses, and selecting the key, entering into the device the data indicated by the key map when the corresponding key is pressed.

An exemplary aspect of the inventive the device includes a display, and the display displays the keys of the device.

An exemplary aspect of the invention is embodied where the keys displayed on the device are blank.

An exemplary aspect of the invention is embodied where the keys displayed on the device are encrypted.

In an exemplary aspect of the invention, the keys are displayed on the device form a keyboard, and the keys are scrambled from a normal position on the keyboard.

An exemplary aspect of the invention may include generating the key map with the device and transmitting the key map to the glasses.

In another exemplary aspect of the invention, the key map may be generated with the glasses and transmitted to the device.

An exemplary aspect of the invention may include changing the key map upon occurrence of a predetermined event.

An exemplary aspect of the invention may include encrypting the key map prior to transmitting the key map to the glasses.

An exemplary aspect of the invention may include changing the key map after each key press.

An exemplary aspect of the invention may include communicating information relating to the key map with headphones.

An exemplary aspect of the invention may include communicating the data entered into the device with headphones.

An exemplary aspect of the invention may include transmitting information relating to the key map with headphones.

An exemplary aspect of the invention is embodied as a method of authenticating including providing glasses, recording, with the glasses, a blink sequence performed by a user, converting the blink sequence into data, and entering the data corresponding to the blink sequence into a device.

In another exemplary aspect of the invention, the blink sequence is used as Morse code.

An exemplary aspect of the invention includes displaying a blinking key to the user with the glasses, the blinking key correlating blink patterns to characters to be entered into the device.

An exemplary aspect of the invention includes setting the blink sequence to correspond to a password prior to the recording of the blink sequence performed by the user.

In an exemplary aspect of the invention, recording the blink sequence includes displaying a map of characters associated with different blink sequences, recording a first blink sequence performed by the user, displaying a map of a sub-set of characters associated with different blink sequences based on the first blink sequence, recording a second blink sequence performed by the user corresponding to the sub-set of characters.

An exemplary aspect of the invention is embodied as crypto-glasses including a frame configured so as to be worn by a user, a processor, a display device communicating with the processor so as to dynamically display data, a communication unit connected to the processor and configured so as to transmit data to a device performing an authentication. The data includes a key map that correlates data input into the device with keys of the device, the key map indicating data different from that visually indicated by the keys of the device.

In an exemplary aspect of the invention, the key map is generated by the device to be authenticated and transmitted the crypto-glasses.

In an exemplary aspect of the invention, the display device includes a projector configured so as to project an image on a lens of the crypto-glasses.

In an exemplary aspect of the invention, a new key map is generated after a predetermined event.

In an exemplary aspect of the invention, a new key map is generated after every key press.

An exemplary aspect of the invention is embodied as crypto-glasses including a frame configured so as to be worn by a user, a processor, a camera disposed so as to record physical gestures of the user, a communication unit connected to the processor and configured so as to transmit data to a device performing an authentication.

In an exemplary aspect of the invention, the physical gestures include blinking performed by the user.

An exemplary aspect of the invention includes a display device communicating with the processor so as to dynamically display information.

In an exemplary aspect of the invention, the data includes a blinking key, the blinking key correlating blink patterns to characters to be entered into the device performing the authentication.

In an exemplary aspect of the invention, the processor correlates the physical gestures with characters and transmits the characters to the device performing the authentication.

The above aspects may provide enhanced security when performing an authentication with a display device.

In addition, while the exemplary embodiments are described in relationship to a conventional smartphone, the invention and method applies to tablets, laptops, military goggles, ATMs, and any other system into which an authentication code must be entered.

BRIEF DESCRIPTION OF THE DRAWINGS

The foregoing and other purposes, aspects and advantages will be better understood from the following detailed description of exemplary non-limiting embodiments of the invention with reference to the drawings, in which:

FIGS. 2A and 2B illustrate exemplary methods of generating and transmitting of a key map;

FIG. 3A illustrates an exemplary keyboard as seen on a smartphone and a key map provided by the crypto-glasses;

FIG. 3B illustrates another exemplary keyboard as seen on a smartphone and a key map provided by the crypto-glasses;

FIG. 4 illustrates an exemplary table of blinking values;

FIG. 5 illustrates another exemplary table of blinking values;

DETAILED DESCRIPTION OF EXEMPLARY EMBODIMENTS OF THE INVENTION

Figure 1:
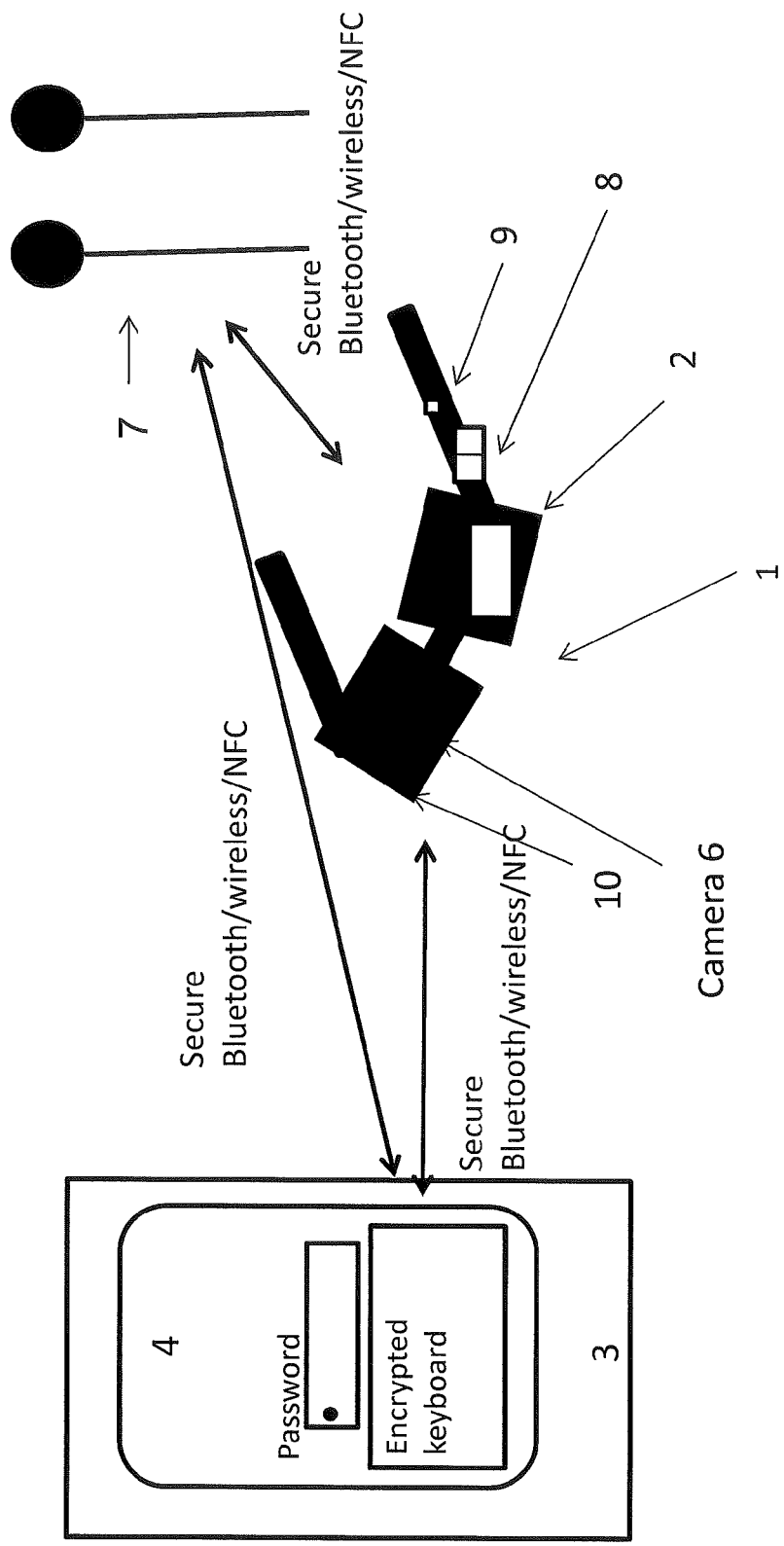
FIG. 1 illustrates an exemplary embodiment of the crypto-glasses and a smartphone.

FIG. 1 illustrates an exemplary embodiment of the invention which includes a pair of crypto-glasses 1 having a frame 10 to facilitate wear as well as a processor 9 and a display unit 2 for transmitting to the user visual information or cues related to data entry into device 3. Of course, the invention can be applied to any form of eyewear (e.g., single window goggles, monocle, military goggles, etc.).

The crypto-glasses 1 are used in the interaction with a display device into which data is to be entered. In an exemplary embodiment, the display device may be a device that includes a display into which data is entered such as a smartphone, tablet, etc. For simplicity, exemplary aspects of the invention are described in relation to a smartphone 3 as the display device. However, the invention may be used in conjunction with any device into which data is entered.

In operation, display unit 2 of crypto-glasses 1 may show a key map or other information with which user can identify which key of the smartphone 3 (for example which key displayed on a smartphone screen), corresponds to the character the user wishes to enter into the smartphone 3.

The type of display unit 2 used in the crypto-glasses 1 is not particularly limited and may be any type of display that can adequately show the user the desired key mapping data (password key). Such a display unit 2 may be anything from a device which projects the image onto a lens 5 of the crypto-glasses to a display screen disposed where it may be seen, either on the lens or otherwise. The image may be projected anyway as long as it is visible to the user only. For instance, the image may appear to be floating at any perceivable distance from the user.

In the system of FIG. 1, communication between crypto-glasses 1 and smartphone 3 occurs wirelessly through communication unit 8. The communication may be conducted over an encrypted connection for additional security. However, the communication method used is not particularly limited and may be, for example, Bluetooth, near field communication (NFC) or any appropriate wired or wireless system.

In one aspect of the invention, the crypto-glasses 1 receive the encrypted display information from smartphone 3, decrypt the display information, and show the user the display information (such as a key map) through the use of display unit 2 in crypto-glasses 1. For instance, as illustrated in FIG. 2A, the smartphone 3 may generate the actual location of the characters corresponding to the keys (e.g., a key map) (S1) and transmit the key map to crypto-glasses 1 (S2). The crypto-glasses 1 then transmit the key map information to the user (S3) and the user enters the authentication data based on the key map (S4). However, as illustrated in FIG. 2B, exemplary embodiments may also allow the crypto-glasses 1 to generate the key map (S2-1) and transmit the display information and actual key location (e.g., key map) to the smartphone 3 (S2-2). The crypto-glasses 1 then transmit the key map information to the user (S2-3) and the user enters the authentication data based on the key map (S2-4).

In one embodiment, processing of encryption would be done on the smartphone 3. The crypto-glasses 1 decrypts the encrypted display information, whether or not the encrypted data is transmitted to the crypto-glasses 1, and displays it for the user. Another method for the crypto-glasses 1 to receive encrypted data displayed on the smartphone 3 is by the process of optical character recognition or by other means. Preferably, any interaction originating from the crypto-glasses 1 that would be sent to the smartphone 3 or some other device is encrypted at the crypto-glasses 1, if encryption is needed. The receiving device then decrypts the information. Data transmission may occur as required by the encryption or mapping protocol used above. In addition, in one implementation, for each character, the keyboard mapping changes and a new mapping is transmitted to the crypto-glasses 1.

In practice, processing may be done at either the crypto-glasses 1 or the smartphone 3 or the processing may be done at both the crypto-glasses 1 and the smartphone 3. By processing at both the crypto-glasses 1 and the smartphone 3 so that security may not be compromised. In addition, in exemplary embodiments the data transferred may always be encrypted so that a nearby device may not just "sniff" the communication.

In operation, display unit 2 of the crypto-glasses 1 may display a keypad illustrating the keys corresponding to the actual character entered by the key displayed on the smartphone 3. For example, display 4 may show a key having the character "G" while the character entered by pressing that key will instead be "H". Meanwhile, the display unit 2 of crypto-glasses 1 will display a key map illustrating that the key "G" on display 4 is actually key "H". This may be accomplished by providing an illustration of a keypad with the actual corresponding keys by display unit 2 in crypto-glasses 1 to the user or by virtually overlaying "H" on the "G" key of display 4 as seen through the lens of crypto-glasses 1. This method is not limited to the exemplary embodiments above and may include any approach that makes it clear to the user as to what is actually being entered by means of the key map.

The actual image/method used to convey the key map information to the user is not particularly limited. For instance, the display unit 2 may show a key map in a table form, or some other form, which communicates to the user which character(s) are associated with which key on the display such as G→H.

When a password is to be entered into the smartphone 3, a display screen 4, such as a touch screen of smartphone 3, displays a blank keypad or a keypad with encrypted characters. The method of encryption for the displayed characters may vary. For instance, the character displayed on a key may differ with the actual character the key corresponds to when activated or "pressed" by a user. The location of the displayed characters may also be scrambled from that of a normal keypad. One example of communicating the correct (mapped) keyboard to the user is displaying the "actual" keyboard with the crypto-glasses so that user can correlate an actual character with the encrypted character or key location. In addition, combinations of pressed keys can also be mapped to a character.

Examples of a displayed scrambled keypad and the actual keys corresponding to the display (key map) are shown in FIGS. 3A and 3B. For instance, in the embodiment of FIG. 3A, if the "S1" is pressed on the smartphone display 4, an "a" will actually be entered.

FIG. 3B illustrates another means of encryption where (p, n) is the private RSA key, (g, n) is the public key, and r is a random number greater than 1. Of course, any encrypting concept may be used on the key map displayed with the crypto-glasses 1 and smartphone display 4.

In addition, the position of the keys, displayed on the smartphone 3 and/or the actual location of the keys, can be reshuffled. The reshuffling of the keys may occur after every key press or some other interval. Since the actual key locations are not displayed on display 1, and the position of the key pressed may not correspond with the normal position, an observer may not be able to discern the password. Further, if the keys are reshuffled, such as after every key entry, it will be more difficult for an observer to decipher which position relates to which key after a number of characters have been entered.

Embodiments of crypto-glasses 1 may also include a headphone(s) 7 or other biometric mechanisms. Headphones 7 can be used to provide the user audible information as to which keys correspond to which actual letter or some other information to facilitate entry of the password on display 4. In addition, the headphones 7 may recite the actual key entered when the user "presses" a key on the display 4. This enables a user to know that the correct key has been entered without the need to display the entered key on display 4. The headphones 7 may communicate directly to the display device 4 or to crypto-glasses 1. The method of communication is not particularly limited. For instance, the communication may be performed wirelessly through an encrypted signal. In addition, the actual key entered may be displayed to the user with the crypto-glasses 1.

In an aspect of the invention, in order to add another layer of security, after the user enters a character into smartphone 3, the smartphone 3 may send out another code to the crypto-glasses or headphones. The crypto-glasses 1 or headphones 7 decrypt the communication and transmits the code to the user. The user then speaks or types the code to/on the smartphone 3, adding another layer of security.

In another aspect of the invention, crypto-glasses 1 are used in conjunction with a "physical" keyboard (e.g., a keyboard for a computer). For example, crypto-glasses 1 may show a user the key map for the standard keyboard so as to allow secure entry of data. In this instance, the normal keys can correspond to different actual characters when pressed. For increased security, the key map can be reshuffled after every key entry or some other period. Thus, data entry using a physical keyboard of a computer can be made secure.

Through the use of a key map visible only to the wearer of the crypto-glasses, secure entry of passwords may be obtained. This in turn may allow a display device, such as a smart phone, to be made suitable for accessing secure information.

Another exemplary embodiment of the invention includes a pair of crypto-glasses 1, which communicates with a smartphone 3 as discussed in the previous embodiments. In this exemplary embodiment the user enters the password by a physical gesture, such as blinking (e.g., sequence, specific eye or duration), eye movement, hand gestures, etc., which is detected by crypto-glasses 1.

The smartphone 3 may decrypt the output of crypto-glasses 1 and blink decoding. For example, smartphone 3 may correlate the blink or blink sequence to a table in order to determine the character or word that the blink or blink sequence corresponds to.

In an exemplary operation of crypto-glasses 1, a user blinks according to the password to be entered into smartphone 3 and the mapping between blinks and characters/words. Crypto-glasses 1 then encrypts the blink pattern and transmits the pattern to smartphone 3 directly or via some other device such as headphones 7. The smartphone 3 then decrypts the pattern by using a conversion table for blinks to characters/words. Crypto-glasses 1 may display on display unit 2 a blinking key correlating blink patterns with characters/words.

Many different gestures or blink patterns may be used to enter data. Such exemplary systems can range from using Morse code to enter characters, through long/short or left right blinks for example, blink maps relating blink patters to characters, and/or using blinks as a selection method.

For instance, as illustrated in FIG. 4, blink signals may be differentiated by using left versus right eye, an open eye versus a partially open eye, long versus short blinks, or some other combination.

As shown in FIG. 5, a group of possible characters is selected and then the individual character is selected. This may, for example, be done by going through ("scrolling") the options until the correct character is reached, and then another blink would select the unique character. Of course, many other deviations are possible. This could also be done in a hierarchical system where a group is selected, and then another blink type selects an actual character or further subgroup. In other words, a blink can correspond to a group of characters, a single character, or a hierarchical group election.

Figure 6:
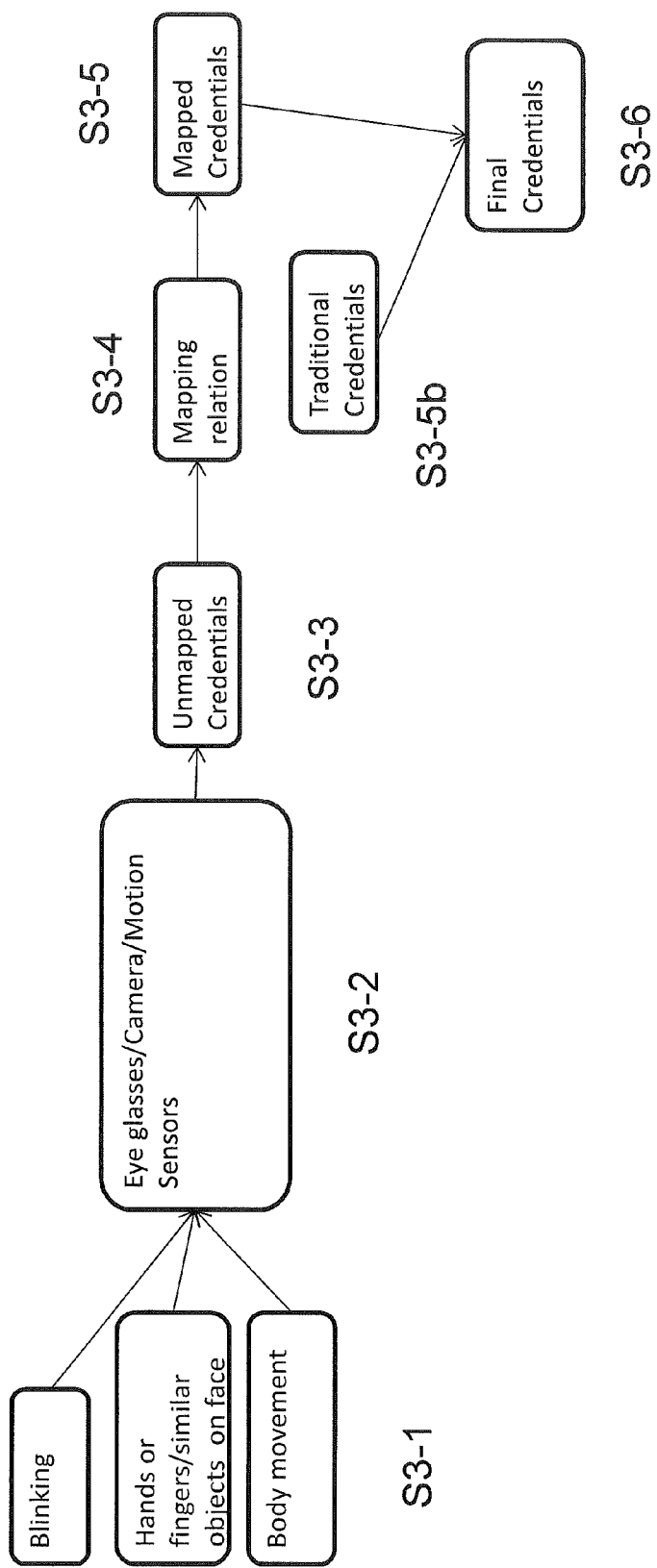
FIG. 6 illustrates a method of authenticating using blinking.

FIG. 6 illustrates an exemplary flowchart of a method of processing blinks into a password.

As shown in FIG. 6, a physical gesture(s) is performed (S3-1). This gesture is detected by the glasses 1 by a camera 6, motion sensor, or by some other detection means (S3-2). The input from the camera is converted into "unmapped credentials" (S3-3). The unmapped credentials are then mapped to produce mapped credentials (S3-4). These mapped credentials (S3-5a), along with optional traditional credentials (S3-5b) form the final credentials (S3-6).

Additionally, in an exemplary embodiment, the crypto-glasses 1, smartphone 3, or another device/application may have the password stored in encrypted memory. In this example, a series of blinks corresponding to one or more characters is entered and the appropriate device discerns if the sequence corresponds a stored password. If a match is found, then the stored password is entered.

An example of such a blink table which may be used is shown in FIG. 5. We use lb to denote a long blink of both eyes, sr to denote a short blink with the right eye, etc. Using this table for a password of wH0Zon1$st, the blink sequence would be lb,sl,sb,sl,sr,sb,sr,sl,sl,sb.

In the above example, even with each blink type corresponding to more than one possible character, the probability of a random correct guess is $6^{-n}$ for a password of length n. This means that with an 8-character password, there is less than one millionth chance of a correct guess. Of course, this is only an example, and exemplary embodiments may use more than 6 groups or less as the tradeoff between security and ease-of-use dictates.

In another exemplary embodiment, the blink table may have a hierarchical structure such that one group of characters is selected by blinking and a sub set is subsequently selected by blinking, either by blink code or by waiting as the entries in the group are highlighted in an image displayed in crypto-glasses 1. In this way, many characters may be entered by using relatively few blink patterns.

For instance, in this example all the letters of the alphabet are placed into 3 groups on the screen (group 1 for left eye blink, group 2 for right eye blink, and group 3 for blinking both eyes together). Once a selection is made, the user is presented with another set of 3 groups, and so on. The set of letters can be replaced with any set of objects/shapes, numbers, alpha-numeric combinations, etc.

Figure 7:
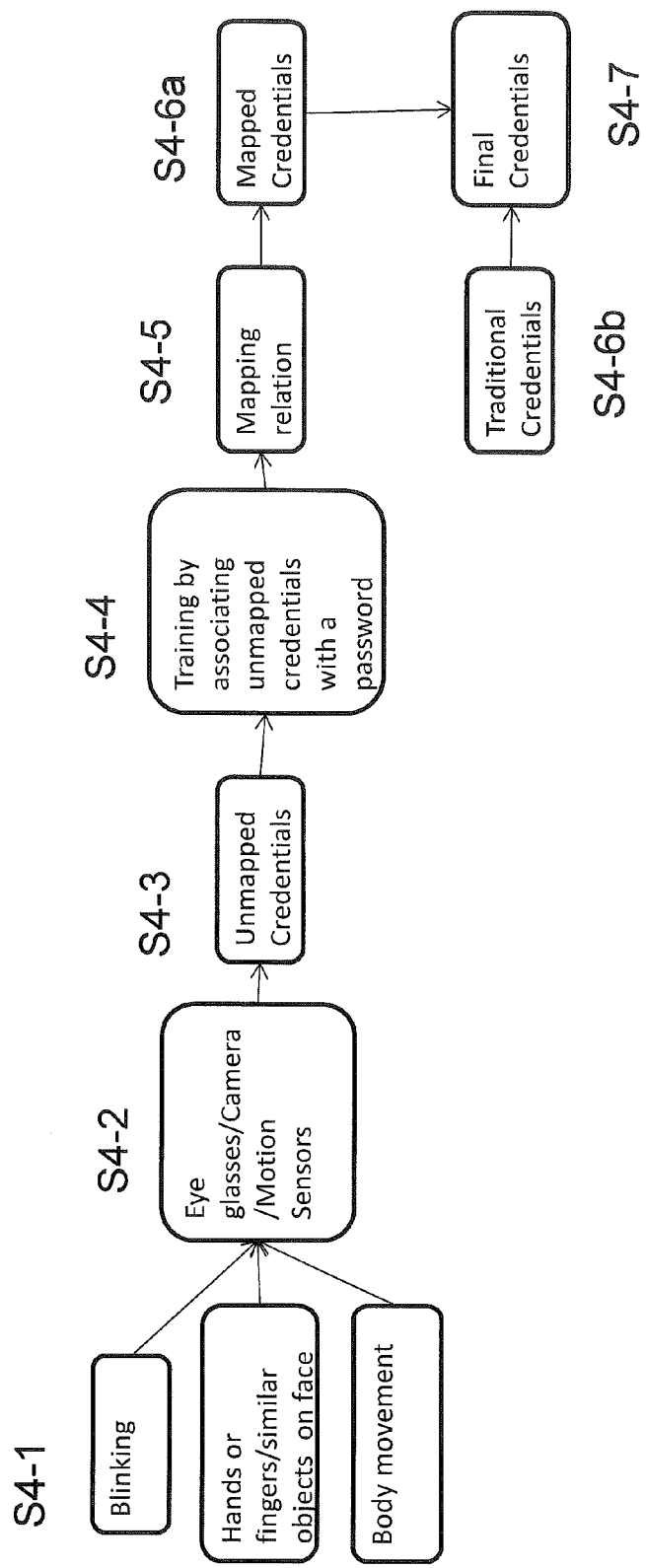
FIG. 7 illustrates a method of creating credentials based on a blink pattern.

As shown in FIG. 7, the system may allow a particular blink sequence, blink duration or eye movement pattern to be associated with a user's credentials. For example, a user may perform a certain physical gesture, such as a blink pattern, which is captured by crypto-glasses 1 (S4-1) through a camera 6, motion sensor, or some other device (S4-2). The unmapped credentials are thus detected (S4-3). Once this pattern is trained, it is associated with the user's unmapped credentials (S4-4). The mapping relationship is produced and stored (S4-5). Then, when the mapped relationship is performed by the user, it is translated into the user's credentials (S4-6a). In addition, the smartphone 3 may require other traditional credentials to be entered such as a fingerprint, retina scan, voiceprint, other biometrics, etc (S4-6b). This combination can become the final credentials (S4-7).

For instance, the user blinks a certain sequence and this information is sent to smartphone 3. The smartphone 3 will then convert the blink sequence into some value that is the password. Of course, the password can be converted by the crypto-glasses 1 and the result sent to the smartphone 3.

The key-blink mapping may be displayed in crypto-glasses 1. This allows the user to avoid memorizing key blink-codes, which in turn helps reduce the cognitive load on the user. The selected key can be displayed with the crypto-glasses 1 to aid the user. In addition, the key-blink mapping can be changed each time data is entered, or at some other interval, so that even if the eye blinks are being tracked it does not lead to password exposure.

To make things both interesting from an interaction perspective, to and make the password harder to crack by tracking eye-blinks, the authentication interaction can be modeled as a game (and even have levels), where, based on the skill level of the user, various parameters may be changed dynamically; for example, a pair of rapid blinks (instead of one) for a letter, changing the combination of L/R blinks for a letter, invoking the correct letter by providing (guessing) the blinks that will produce it, etc. If the system thinks that the user is taking too much time, or the user is in a hurry, the user can always reduce the level of difficulty of the game and enter the password. In addition, the speed of blinking, etc. may be customized for each user.

Further embodiments of the invention may include additional biometric authentication with the crypto-glasses 1. Such biometric authentication methods could include retina scans, fingerprint, voice recognition, or other known techniques. Such biometric authentications may be required to utilize the crypto-glasses 1 in order to prevent an attacker from using stolen crypto-glasses 1.

In addition, the authentication of the crypto-glasses 1 may be authenticated for a specific duration of time or until an event occurs based on an access control policy on the smartphone 3, the crypto-glasses 1, or both devices. Once the crypto-glasses 1 and/or smartphone 3 are authenticated the devices may be paired and start communicating with each other.

While the invention has been described in teens of exemplary embodiments, those skilled in the art will recognize that the invention can be practiced with modification within the spirit and scope of the appended claims.

Further, it is noted that Applicant's intent is to encompass equivalents of all claim elements, even if amended later during prosecution.

What is claimed is:

1. Crypto-glasses including systems that implement a method of authentication of users by blinking, the crypto-glasses comprising:
   a frame configured so as to be worn by a user;
   a processor;
   a display device communicating with the processor so as to dynamically display data; and
   a communication unit, as executed by the processor, to execute the method of authentication by transmitting data to the display device for performing the authentication of the user to interact with the display device,
   wherein the communication unit is configured to display in an optical unit of the crypto-glasses a key map which correlates data input into the display device with keys of the display device, the key map indicating data different from that of the keys of the display device.

2. The crypto-glasses according to claim 1, wherein the key map is generated by the display device to be authenticated and to transmit the crypto-glasses.

3. The crypto-glasses according to claim 1, further comprising a lens connected to the frame,
   wherein the display device comprises a projector configured so as to project an image on the lens of the crypto-glasses.

4. The crypto-glasses according to claim 1, wherein a new key map is generated after a predetermined event.

5. The crypto-glasses according to claim 1, wherein a new key map is generated after every key press.

6. The crypto-glasses according to claim 1, further comprising a biometric information input unit configured so as to authenticate biometric information of the user.

7. The crypto-glasses according to claim 1, wherein the communication unit is configured so as to pair with the display device performing the authentication until a certain predetermined event occurs.

8. The crypto-glasses according to claim 1, further comprising an auditory device configured so as to provide feedback information relating to the key map to the user.

9. A method of authentication of a user based on blinking of at least one eye of the user, the method comprising:
   detecting, by crypto-glasses, the blinking of the eye of the user;
   determining a blinking pattern;
   mapping the blinking pattern in a database;
   processing the blinking pattern;
   applying an encrypted communication channel between the crypto-glasses and a display device for performing the authentication of the user to interact with the display device; and
   displaying in the crypto-glasses a key map which correlates data input into the display device with keys of the display device, the key map indicating data different from that of the keys of the display device.

10. The method according to claim 9, further comprising:
    transmitting the key map from the display device to the crypto-glasses;
    selecting a key; and
    entering into the display device the data correlated by the key map to the selected key.

11. The method according to claim 9, wherein the display device further includes a display screen, and
    wherein the display screen displays the keys of the display device.

12. The method according to claim 11, wherein the keys displayed on the display device are blank.

13. The method according to claim 11, wherein the keys displayed on the display device are encrypted.

14. The method according to claim 13, wherein the keys displayed on the display device form a keyboard, and
    wherein the keys are scrambled from a predetermined position on the keyboard.

15. Crypto-glasses including systems that implement a method of authentication of users by blinking, the crypto-glasses comprising:
    a frame configured so as to be worn by a user;
    a processor;
    a camera disposed so as to record a gesture of the user; and
    a communication unit, as executed by the processor, to execute the method of authentication by transmitting data to a display device for performing the authentication of the user to interact with the display device,
    wherein the communication unit is configured to display in an optical unit of the crypto-glasses a key map which correlates data input into the display device with keys of the display device, the key map indicating data different from data of the keys of the display device.

16. The crypto-glasses according to claim 15, wherein the gesture comprises the blinking performed by the user.

17. The crypto-glasses according to claim 15, wherein the display device is configured to communicate with the processor so as to dynamically display information.

18. The crypto-glasses according to claim 15, wherein the data includes a blinking key, the blinking key correlating a blinking pattern to one of characters to be entered into the display device performing the authentication.

19. The crypto-glasses according to claim 15, further comprising an auditory device configured so as to communicate the data entered into the display device performing the authentication to the user.

20. The crypto-glasses according to claim 15, further comprising a biometric information input unit configured so as to authenticate biometric information of the user.

* * * * *